United States Patent
Lantto et al.

(10) Patent No.: US 6,205,328 B1
(45) Date of Patent: Mar. 20, 2001

(54) METHOD FOR PROVIDING SUPPLEMENTARY SERVICES TO A MOBILE STATION BY SENDING DTMF TONES TO A REMOTE PARTY OF AN ACTIVE CALL

(75) Inventors: Sven Jörgen Lantto, Tullinge; Mats Ola Stille, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1057 days.

(21) Appl. No.: 08/637,588

(22) Filed: Apr. 25, 1996

Related U.S. Application Data

(63) Continuation of application No. 08/115,589, filed on Sep. 3, 1993, now abandoned.

(51) Int. Cl.[7] .................................................. H04M 3/42
(52) U.S. Cl. ............................................................ 455/414
(58) Field of Search ........................ 379/58, 67; 455/414

(56) References Cited

U.S. PATENT DOCUMENTS

| | | | |
|---|---|---|---|
| 4,228,319 | * 10/1980 | De Jager et al. | 379/58 |
| 4,661,975 | * 4/1987 | Brecher | 379/215 |
| 4,744,102 | * 5/1988 | Koster | 379/215 |
| 4,829,554 | * 5/1989 | Barnes et al. | 379/58 |
| 4,873,719 | 10/1989 | Reese | 379/215 |
| 4,995,074 | 2/1991 | Goldman et al. | 379/97 |
| 5,023,868 | * 6/1991 | Davidson et al. | 370/62 |
| 5,029,198 | * 7/1991 | Walpole et al. | 379/88 |
| 5,086,451 | * 2/1992 | Saegvsa et al. | 379/58 |
| 5,119,397 | 6/1992 | Dahlin et al. . | |
| 5,157,660 | * 10/1992 | Kuwahara et al. | 370/95.1 |
| 5,327,480 | * 7/1994 | Breeden | 379/57 |
| 5,390,241 | * 2/1995 | Bales et al. | 379/207 |
| 5,414,754 | * 5/1995 | Pugh et al. | 379/67 |

FOREIGN PATENT DOCUMENTS 5-308321   11/1993   (JP) .

OTHER PUBLICATIONS

PCT International Search Report, PCT/SE94/00796 Date of Mailing: Jan. 9, 1995.
CCITT's "Blue Book", Fascicle VI.11, entitled "Digital Subscriber Signalling System No. 1 (DSS1)), Network Layer, User Network Management" pp. VI.–X, 3–8, 15, 16 23, 30, 31, 46, 47, 67, 75, 116, 151, 365–378.

* cited by examiner

*Primary Examiner*—William Cumming
(74) *Attorney, Agent, or Firm*—Burns, Doane, Swecker & Mathis, L.L.P.

(57) ABSTRACT

Methods and systems for signalling between a mobile station and a network for requesting supplementary services are disclosed. The network implicitly assumes that signals from a mobile station relate to either a held or active call or that a second action is required after the requested action is performed so that the complexity of the mobile unit can be reduced.

1 Claim, 3 Drawing Sheets

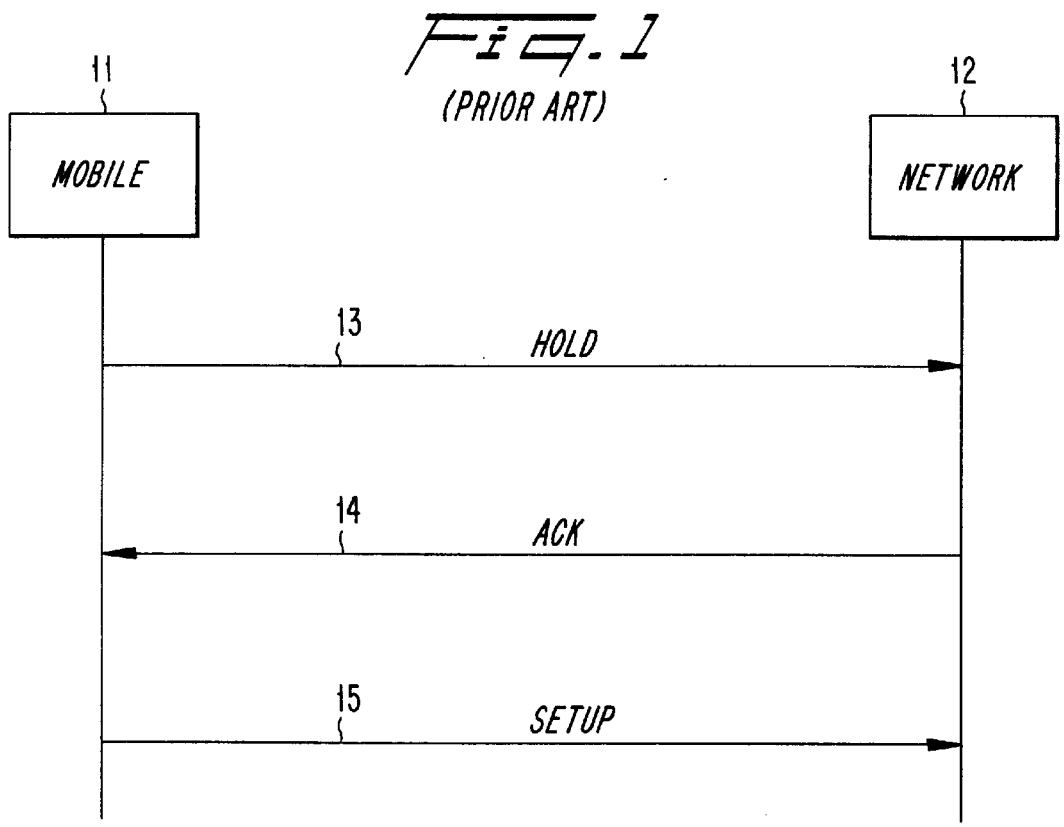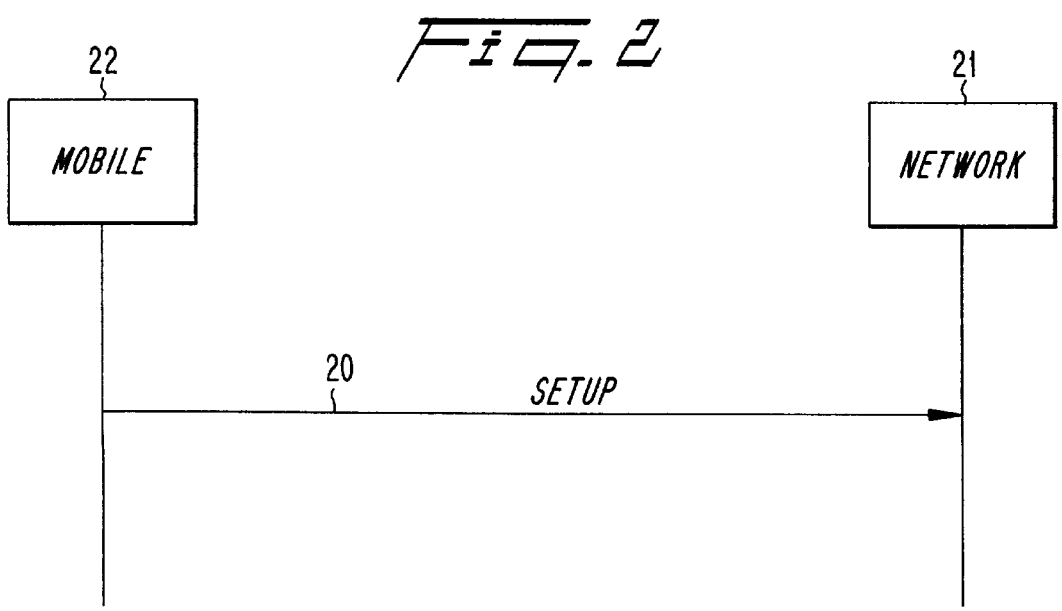

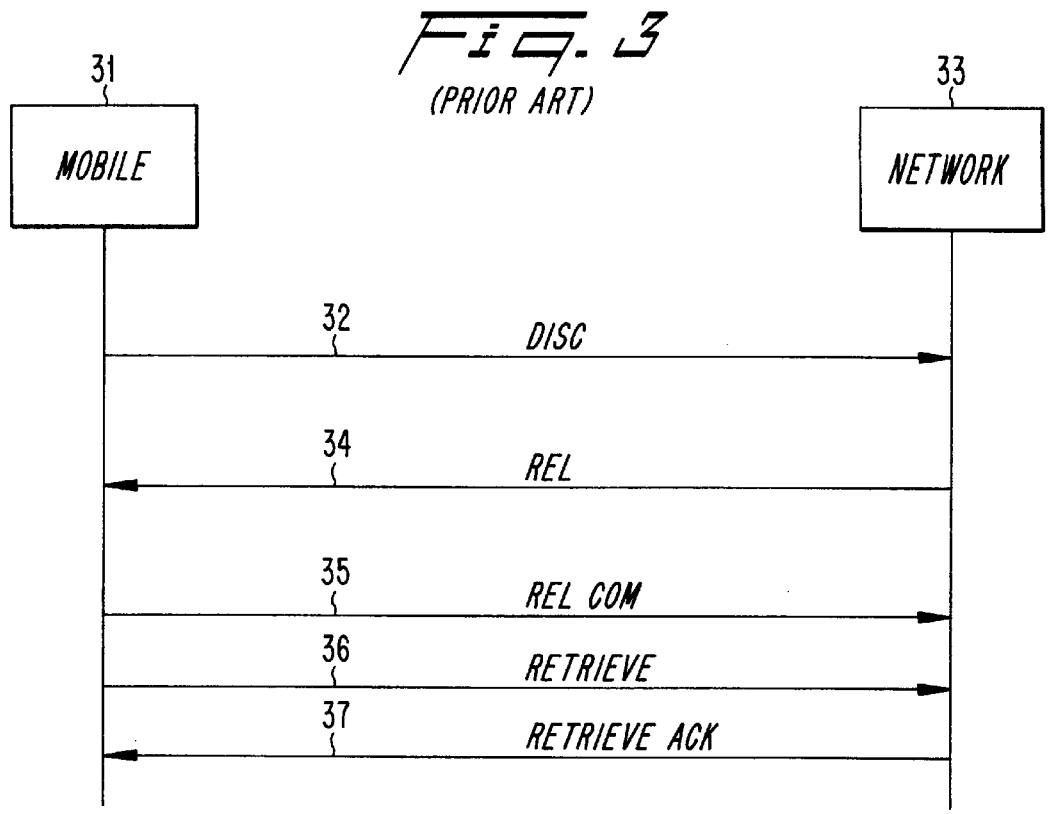
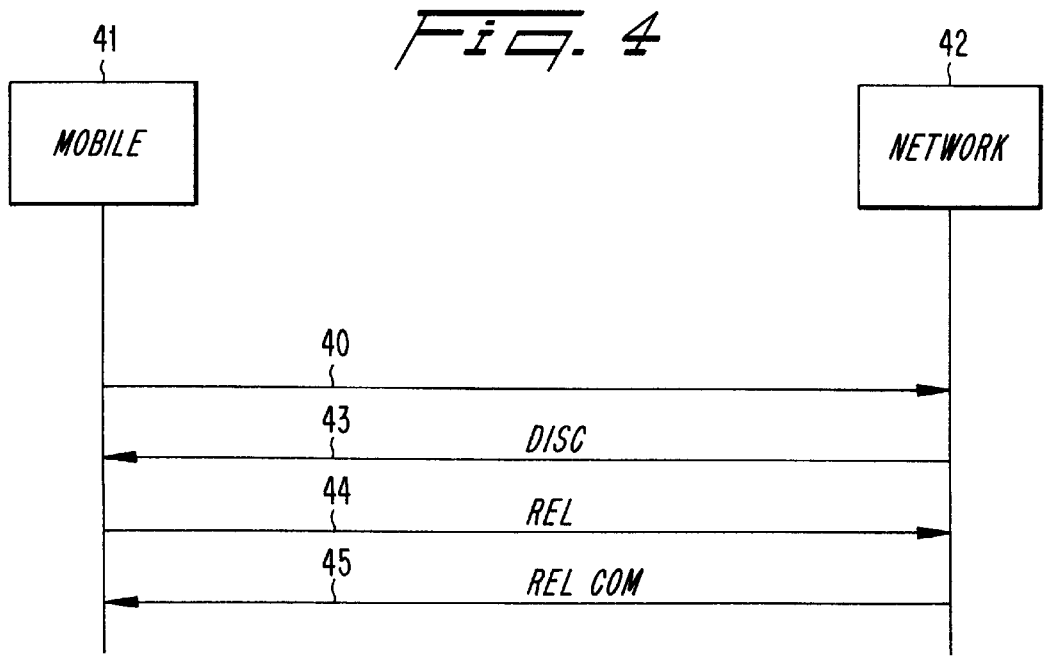

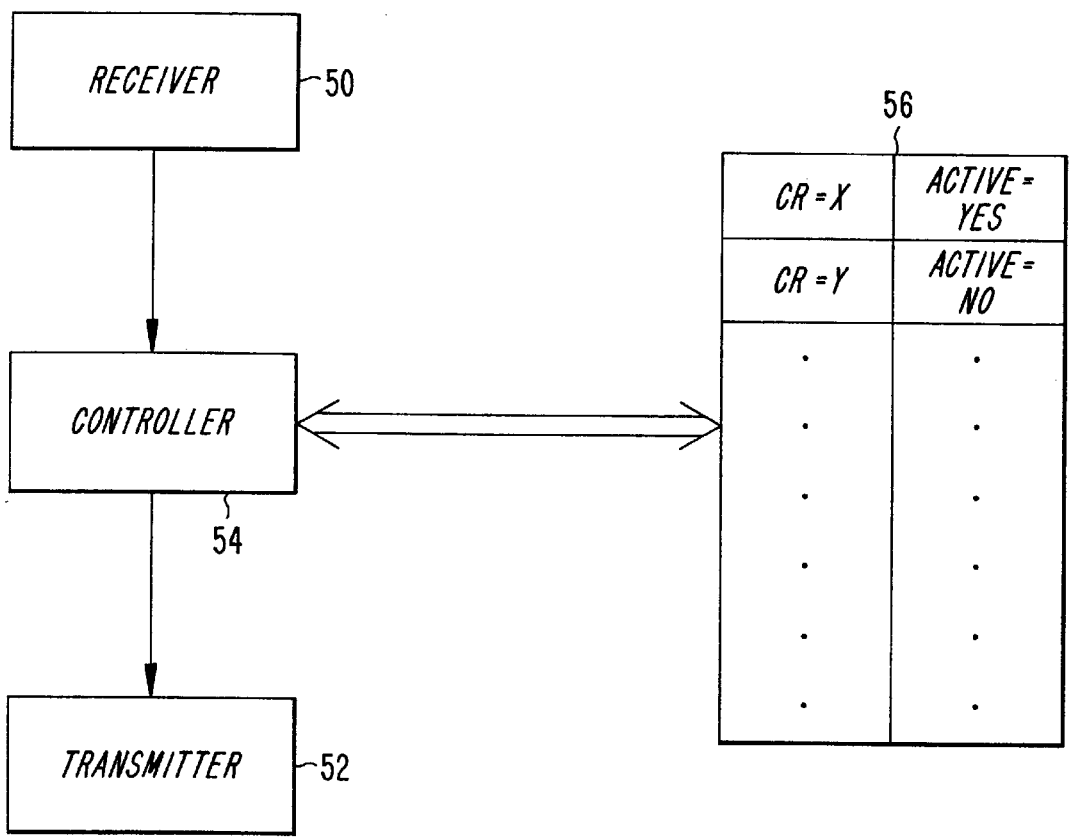

US 6,205,328 B1

METHOD FOR PROVIDING SUPPLEMENTARY SERVICES TO A MOBILE STATION BY SENDING DTMF TONES TO A REMOTE PARTY OF AN ACTIVE CALL

This application is a continuation, of application Ser. No. 08/115,589, filed Sep. 3, 1993, abandoned.

BACKGROUND

The present invention relates to a method and system for signalling between a mobile station and a. network, and more particularly, to signalling between a mobile station and a network for the provision of supplementary services.

Radiotelecommunication technology has exploded in the past decade as a convenient and efficient alternative to conventional communication systems such as the telephone. Mobile telephones, in particular, have found widespread acceptance as personal communication devices due to their portability. The phrases "mobile station" and "mobile unit" as they are used herein refer not only to car-mounted units, but also to any unit which is portable, e.g., personal hand-held units.

The rapid growth in this industry has forced system designers to find ways to increase the capacity of these systems to satisfy the rapidly growing demand. Increasing capacity, however, presents numerous challenges to system designers because the frequency spectrum available for radiotelecommunications is relatively limited. Thus, designers must contend with the inherent tension between the desire to increase capacity and maintain high quality communications on the one hand, and the limited available frequency spectrum and interference considerations on the other hand.

As general demand for radiotelecommunications increases, so too does the demand for mobile system capabilities beyond those which simply establish calls. Users of mobile systems want the additional services which they have become accustomed to in fixed communication networks, for example, call forwarding, call waiting, and conference calling. Those familiar with the communication art will recognize that these are simply examples of the numerous additional services which are now available for users of fixed communication networks. These services are collectively referred to hereafter as supplementary services.

To provide supplementary services in radiocommunication networks, signalling procedures need to be established for the basic functions which comprise the supplementary services. For example, one such basic function which is used to handle several calls is called the "switch and disconnect" function where an active call is released and a held call is retrieved substantially simultaneously. These signalling procedures are combined to define a format which is commonly called the specification of the "air interface" between the mobile units and the network in a radiocommunication system. Thus, when a mobile unit requests a supplementary service, both the network and the mobile use the signalling procedures which are specified by the air interface for that particular system to provide the requested service. An example of such signalling procedures can be found in the "CCITT Recommendations Q.930–Q.932".

In many of the signalling procedures specified in the CCITT Recommendations, the mobile station plays a relatively large role. For example, in a "switch and disconnect" function set forth in the CCITT Recommendations, the mobile station sends both a signal requesting that a call be released and another signal requesting the retrieval of a held call. Similarly, in a procedure for setting up a second call to a particular mobile while a first call remains established, two signals are sent by the mobile station.

Another supplementary service which can be provided in radiocommunication networks is a mobile subscriber's request to send DTMF (Dual Tone Multi-Frequency) tones to a remote party during an active call. Systems for generating DTMF tones and the use of DTMF tones in radiocommunication systems are well known in the art and, therefore, are not further described here. For background purposes, however, U.S. Pat. No. 5,140,627 describes an exemplary DTMF signalling system which is incorporated here by reference.

In digital cellular systems, for example, DTMF tones normally can not be sent directly from a mobile station to a remote party because a speech codec provided in mobile stations for transmitting speech information between a mobile station and the network is not suited for the transfer of DTMF tones. Thus, DTMF service is typically provided by a mobile subscriber sending a Layer 3 message to a network asking that certain digits be sent to a remote party using DTMF tones.

These conventional signalling procedures are problematic in at least two respects. First, the number of signals being sent over the air interface should be reduced so that system capacity can be maximized. Second, many of the conventional signalling procedures which require the mobile station to play a relatively large role consequently require the mobile station to be relatively sophisticated and expensive.

SUMMARY

Accordingly, it is an object of the present invention to overcome these drawbacks in signalling procedures for the provision of supplementary services in radiocommunications. This can be achieved, according to exemplary embodiments of the present invention, by eliminating some of the information transmitted from the mobile station to the network. For example, instead of transmitting information from the mobile station to the network indicating a particular call to connect or disconnect eliminated call reference information is implicitly recognized by the network. In this way, the cost and the complexity of the mobile stations can be reduced.

BRIEF DESCRIPTION OF THE DRAWINGS

These and other features, objects, and advantages will become more readily apparent upon reading the following detailed description in conjunction with the drawings in which:

FIG. 1 is a block diagram illustrating a conventional signalling procedure;

FIG. 2 is a block diagram illustrating a signalling procedure according to an exemplary embodiment of the present invention;

FIG. 3 is a block diagram illustrating another conventional signalling procedure;

FIG. 4 is a block diagram illustrating another exemplary embodiment of the present invention; and FIG. 5 is a general block diagram of a network according to an exemplary embodiment of the present invention.

DETAILED DESCRIPTION

According to various exemplary embodiments of the present invention, existing signalling channels of a radiocommunication system are used to transmit simple request messages related to a particular subscriber-initiated supplementary service that is desired by a mobile subscriber. The request signalling for such a service from the mobile unit to the network, as well as the confirmation signalling from the network to the mobile unit indicating whether or not this service request has been complied with, are transmitted over Layer 3. Layer 3 is a general phrase which defines where, and in which logic channels, a particular message is transmitted and received. Layer 3 is described, for example, in Recommendation Q.930 in CCITT's "Blue Book", Fascicle VI.11, "Digital Subscriber Signalling System No. 1 (DSS 1), Network Layer, User Network Management" which is incorporated here by reference The specific hardware implementations of radiocommunication systems are beyond the scope of the present discussion. However, those skilled in the art will readily appreciate that the present invention can be applied to any such systems wherein signalling for supplementary services occurs between a mobile or portable station and a network. One example of a radiocommunication system is a cellular communication network where a mobile telephone switching center is connected between a public telephone network and one or more base stations which transmit and receive signals from the mobile units. For example, when a call is connected, communication takes place over a traffic channel, whereas the initial connection of a call and transfer of a call from one base station to another typically takes place over a control channel. The specification of such traffic and control channels can be according to the applicable standard for the system being implemented, e.g., GSM, PDC, ADC or IS-7X. For those interested in an exemplary hardware configuration of such base and mobile stations, U.S. Pat. No. 5,119,397 is incorporated here by reference.

According to exemplary embodiments of the present invention, a mobile subscriber desiring a supplementary service can, for example, depress a key combination which corresponds to the desired service. A message is then sent over the air interface via a signalling channel, for example, the control channel in the IS-7X standard, to an associated base station and, from there, to a switching center. The message can contain, for example, an encoded version of the depressed key combination which does not require any further processing on the part of the mobile station prior to transmission. The mobile station merely need know that a supplementary service of some type is desired, but does not require any knowledge as to the particular service being requested.

The mobile telephone switching center includes a number of subscriber profiles, for example stored in memory, for each mobile subscriber that is roaming within the service area of this switching center. Each subscriber profile includes memory locations containing information relating to the various supplementary services which can be carried out for each of the mobile subscribers. These memory locations can be addressed using the number transmitted from the mobile unit, i.e., the key combination. The process of mapping a request to a memory location associated with a particular subscriber can be used to determine if a subscriber requesting a particular supplementary service is, for example, authorized for that service and, if so, to trigger the subroutine in the network which carries out that service. The present invention relates to the signalling that takes place between the mobile and the network and, thus, the various methods whereby the network performs the supplementary services are beyond the scope of the present invention and can be performed according to conventional procedures.

An exemplary embodiment of the present invention will now be described with respect to FIGS. 1 and 2. FIG. 1 is used to illustrate a conventional signalling approach for a supplementary service which sets up a new call while holding an existing call. The lines extending from mobile unit 11 and network 12 are used to illustrate the time order of signals transmitted between the mobile unit and the network.

The first message from the mobile unit 11 to the network 12, illustrated by arrow 13, requests that the active call be put on hold. Assuming that the mobile unit sending this request is authorized for this supplementary service, the network temporarily interrupts the speech transmission between the parties on the active call and then sends message 14. Message 14, from the network to the mobile station, acknowledges the equest for holding the active call. Messages 13, 14 and 15 are, for example, layer 3 messages. Next, the mobile station sends message 15 to the network which includes sufficient information for the network to set up a second call to another specified destination. Message 15 is typically transmitted over the signalling channel. This procedure can be repeated several times if multiple calls are on hold. Subsequent additional signalling between the mobile unit and the network can occur depending on the particular system specifications.

This conventional signalling procedure has the drawback that the division of the procedure into two steps results in additional messages being transmitted over the air interface between the mobile unit and the network. Accordingly, an exemplary embodiment of the present invention illustrated by FIG. 2 overcomes this drawback as discussed below.

In FIG. 2, a single message signal 20 is transmitted to the network 21 from mobile station 22. Message 20 can be transmitted over the signalling channel and includes attributes of a new call to be established, for example, a SETUP message in the IS-7X standard. Upon receipt of this signal, one of the functions assigned to the network is to determine if the mobile unit sending the message 20 already has an active call. If so, the network interprets the message 20 as a request for placing the active call on hold and then establishing the second call. Thus, the purpose served by the first message 13 in the conventional signalling approach has been implicitly performed by the network without the need for the additional signals. Accordingly, the signalling needed to perform this supplementary service has been reduced thereby increasing system capacity.

Another exemplary embodiment of the present invention will now be described with respect to FIGS. 3 and 4. This exemplary embodiment relates to a procedure used in supplementary services called "switch and disconnect". If, as for example described in the earlier exemplary embodiment, a first call is put on hold and a second call is established, it may later be desirable to retrieve the first call after the subscriber is finished with the second. This can be accomplished using the switch and disconnect procedure.

FIG. 3 illustrates a conventional approach to the switch and disconnect procedure. A mobile station 31, having both an active call and a held call, sends a first message 32, over Layer 3, to network 33. The message 32 includes a release command along with an identification of which of the two calls is to be disconnected, in this instance the active call. This identification can, for example, be made in accordance with the Call Reference specification of CCITT Recommendation Q.931. After receiving a DISCONNECT message 32, a RELEASE signal, indicated by reference numeral 34, is sent from the network 33 to the mobile station 31 relating to the disconnecting of the active call. After the active call has been released, mobile station 31 then sends a RELEASE COMPLETE message 35 and a RETRIEVE message 36 requesting that the held call be retrieved. Other signalling, for example, a RETRIEVE ACK signal 37, can take place if required by the specification of the particular system being implemented.

This situation is analogous to the conventional signalling procedure described with respect to FIG. 1 in that the process has again been divided into two separate steps which require separate signals to be transmitted between the mobile and the network. Moreover, the conventional procedure described with respect to FIG. 3 also has the drawback that the mobile station needs additional circuitry or programming necessary to "understand" what steps comprise the switch and disconnect procedure. For example, a mobile station operating according to this conventional procedure needs to be able to identify the call which is to be disconnected for the transmission of message 32 as well as recognize that a retrieve message signal 36 should be sent after the active call has been disconnected. Thus, this conventional procedure has the drawback of increasing the complexity and cost of the mobile station which needs to know which call is the active call for the transmission of message 32.

These and other drawbacks are overcome according to an exemplary embodiment of the present invention which will now be described with respect to FIG. 4. When a subscriber desires a supplementary service which uses the switch and disconnect procedure, a message signal 40 is transmitted from the mobile station 41 to the network 42. The message signal 40 includes an information component which is recognized by the network as a request for the switch and disconnect service. For example, the message signal 40 could include a CCITT Q.931 Feature Activation information element which has been defined in the system as a request for the switch and disconnect service.

If the particular system in which the present invention is being implemented requires an identification of a call being disconnected, the mobile station can arbitrarily identify one of the established call references, for example in accordance with the appropriate cellular standard. Moreover, exemplary embodiments of the present invention provide for usage of any other value, for example, an arbitrary call reference can be used, or a value indicating service signalling during an established call. The network will interpret the received switch and disconnect command as a command to disconnect the active call. Thus, the mobile unit's function in this procedure has been limited to simply sending a signal indicating that a switch and disconnect is to be performed without being aware of the substance of that signal or subsequently having to identify a particular call for release. Upon reception of the message signal 40, the network 42 orders the release of the active all with respect to both the mobile station 41 and the other remote active party or parties. The network 42 then automatically reestablishes speech communication between the subscriber of mobile unit 41 and the previous remote party which has been on hold. The disconnection of the released call is performed by signals 43–45 in a manner similar to that discussed with respect to FIG. 3. In this way, mobile station complexity can be reduced since the burden of knowing which call is active is placed on the network 42.

As mentioned earlier, a subscriber can also request the transmission of DTMF tones to a remote party. As with the previous exemplary embodiment, however, a subscriber may have many calls currently pending including, for example, an active call and one or more calls on hold. Thus, in conventional procedures for requesting the transmission of DTMF tones, a mobile station needs to send a message including a call reference which identifies the active call to which DTMF tones are to be transmitted. This presents the problem that the mobile station will have to be sophisticated enough to recognize that a service is being requested which requires the identification of a particular call and then to identify that call in the message sent to the network.

According to an exemplary embodiment of the present invention, this difficulty is overcome by transmitting a single message from the mobile station to the network which requests that DTMF tones be sent to a remote party. If this is accomplished, for example, by transmitting a Layer 3 message including the DTMF information which requires that one of the existing calls be identified, the mobile station can identify any of the existing calls, active or held, or simply insert another arbitrary value in an identification field. The identification field could also contain a value indicating service signalling.

The network will interpret the message as a request to transmit the DTMF tones to the remote party associated with the active call, regardless of which call is identified in the message. In this way, the mobile unit will not need additional circuitry or programming for processing the supplemental service request for DTMF tone transmission.

The foregoing exemplary embodiments have described the network as interpreting a message signal from a remote station in such a way that the remote station need not transmit additional information. An example of how the network performs this interpretation will now be discussed with respect to FIG. 5.

FIG. 5 is a very general block diagram which illustrates a portion of a network for a communication system according to an exemplary embodiment of the present invention. Those skilled in the art will recognize that many of the network details, such as the details of reception 50 and transmission 52 systems, have been omitted for clarity, since the present invention is intended to encompass all types of networks and communication systems. In FIG. 5, a controller 54 receives a message from a remote station to disconnect an active call. The controller 54 then accesses the call data stored in memory 56 for each call associated with the remote unit (i.e., each call assigned to a signalling channel that has been allocated to the remote unit) which transmitted the disconnect message to determine which call should be disconnected since the message from the remote station is not intended to provide this information directly.

Among other call data, a call reference and an indication as to whether that call is active or held, shown in FIG. 5 as an ACTIVE flag, are stored in memory 56. Subsequently, the network disconnects the active call and releases the call reference used for that particular call using the messages DISCONNECT, RELEASE, and RELEASE COMPLETE with the call reference stored in memory that is associated with the active call, which in the example of FIG. 5 would be call reference x.

Although the present invention has been described in terms of various exemplary embodiments, these examples are intended to simply be illustrative of the invention and should not be construed as restricting or narrowing the invention in any way. Thus, the present invention can be applied to other supplementary services which have not been explicitly recited in the exemplary embodiments which relate to manipulating a plurality of established calls for a particular remote unit, such as alternating between calls and conference calling.

Moreover, while the exemplary embodiments of the present invention alternately use the terms "mobile stations" and "remote stations" to describe the equipment which is communicating with the network, those skilled in the art will appreciate that any and all types of remote equipment can be used in conjunction with the present invention. All modifications and variations of the exemplary embodiments, as well as other embodiments, are considered to be within the scope and spirit of the present invention as defined by the appended claims.

What is claimed is:

1. A signalling method for a radiocoinmunication system having a mobile station and a network comprising the steps of:

establishing an active call and a held call between said mobile station and said network;

transmitting a signal from said mobile station to said network requesting that DTMF tones be transmitted;

detecting, in said network, that said mobile station has a call on hold; and interpreting, in said network, said signal as a request to send DTMF tones to a remote party associated with said active call; and sending DTMF tones to said remote party associated with said active call rather than to a remote party associated with said call on hold.

* * * * *